Sept. 5, 1933.                R. E. RUTLEDGE                1,925,112
                               EGG CASE FLAT
                            Filed June 11, 1932
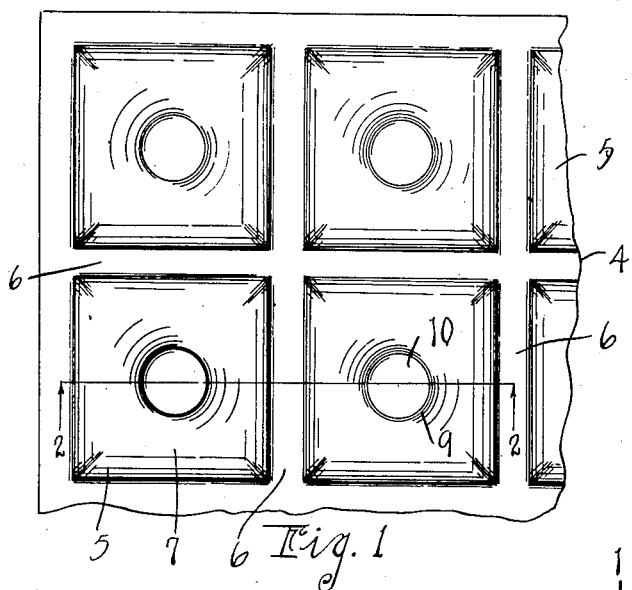
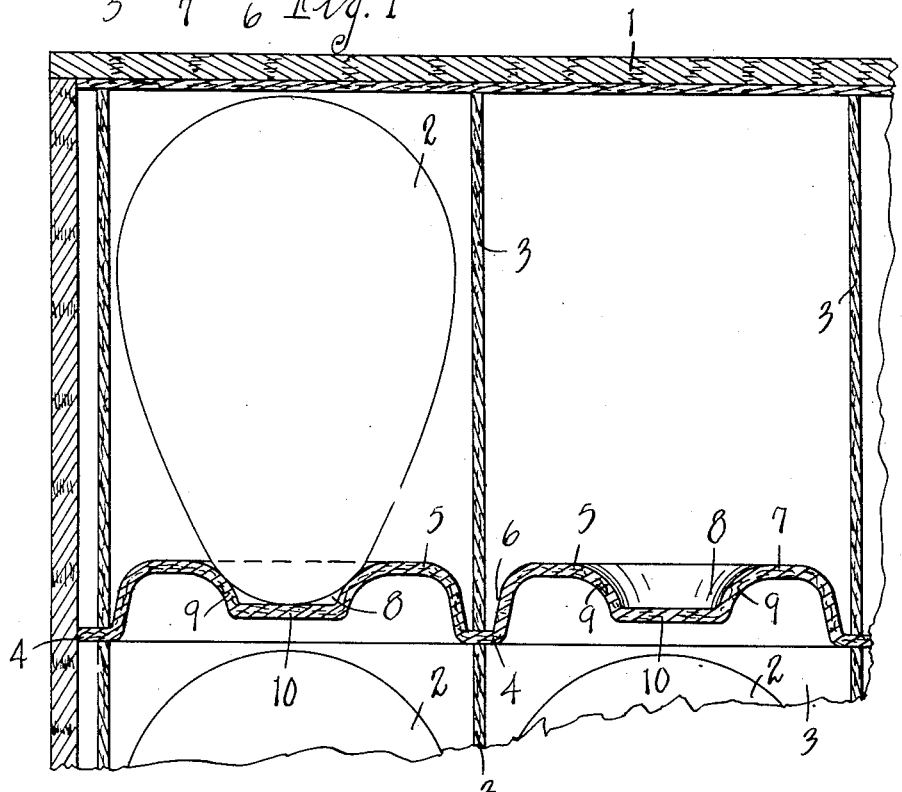
INVENTOR
Robert E. Rutledge
BY
Chappell & Earl
ATTORNEYS

UNITED STATES PATENT OFFICE 1,925,112

EGG CASE FLAT

Robert E. Rutledge, Kalamazoo, Mich., assignor to Sutherland Paper Company, Kalamazoo, Mich.

Application June 11, 1932. Serial No. 616,615

5 Claims. (Cl. 217—27)

The main object of this invention is to provide an egg flat that can be readily formed from a sheet of fibrous material such as heavy paper or light cardboard by means of dies, and which is effective in supporting the eggs.

A further object is to provide an egg flat which may be very economically produced and is very strong in proportion to the material used.

Objects pertaining to details and economies of my invention will definitely appear from the description to follow. The invention is defined in the claims.

A structure embodying the features of my invention is clearly illustrated in the accompanying drawing, in which:

Fig. 1 is a fragmentary plan view of my improved egg flat.

Fig. 2 is a vertical section through an egg case or crate embodying my improved egg flats, the eggs being conveniently illustrated to show the relation in use.

Referring to the drawing, 1 represents an egg case or crate, 2 the eggs, and 3 the cells or fillers. My improved egg flat 4 has rectangular raised portions 5 disposed in rows in spaced relation providing intersecting grooves 6 adapted to receive the fillers 3 as shown in Fig. 2. The raised portions have substantially flat tops 7 with central recesses 8, the sides 9 of the recesses being preferably inwardly curved and their bottoms 10 flat as shown in the drawing. These recesses are relatively small, that is, they are not designed to receive a substantial portion of the egg but to receive the end, preferably the small end, as shown in Fig. 2, positioning the egg in upright position in the cell.

It will be understood, of course, that in practice the eggs will not always remain upright and out of contact with the walls of the cells but the load or weight of the egg is carried by the flats, the small end of the egg being downward as the small ends are much stronger than the larger ends.

The flats may be readily formed by dieing or pressing from heavy paper or light cardboard material. While capable of sustaining the loads to which they are subjected, they provide effective supports and cushions for the eggs.

My improved egg flats may be very economically produced and at the same time are highly satisfactory for the purpose.

Having thus described my invention what I claim as new and desire to secure by Letters Patent is:

1. An egg case flat having a plurality of rectangular raised portions disposed in rows in spaced relation providing grooves adapted to receive fillers, said raised portions having substantially flat tops with central depressed imperforate portions providing egg supporting and positioning recesses.

2. An egg case flat having a plurality of rectangular raised portions disposed in rows providing grooves adapted to receive fillers, the tops of said raised portions having central egg supporting and positioning recesses, the sides of said recesses being inwardly curved and their bottoms imperforate and flat.

3. An egg case flat having a plurality of rectangular raised portions disposed in rows providing grooves adapted to receive fillers, the tops of said raised portions having central imperforate egg supporting and positioning recesses, the sides of said recesses being inwardly curved.

4. An egg case flat having a plurality of rectangular raised portions disposed in rows providing grooves adapted to receive fillers, the top of said raised portions having central egg supporting and positioning recesses, the bottom of said recesses being imperforate and flat.

5. An egg case flat having a plurality of rectangular raised portions disposed in rows in spaced relation providing grooves adapted to receive fillers, said raised portions having substantially flat tops with central depressed imperforate portions providing egg supporting and positioning recesses, the sides of said recesses being inwardly curved.

ROBERT E. RUTLEDGE.